United States Patent
Sabin et al.

(10) Patent No.: US 11,137,827 B2
(45) Date of Patent: Oct. 5, 2021

(54) SYSTEM FOR ALIGNING A SCREEN PROTECTOR ON AN ELECTRONIC DEVICE

(71) Applicant: ZAGG Intellectual Property Holding Co., Inc., Midvale, UT (US)

(72) Inventors: Cecily Sumsion Sabin, Draper, UT (US); Debbie Mauerman, North Salt Lake City, UT (US); Manuel Carreon, Lehi, UT (US)

(73) Assignee: ZAGG Intellectual Property Holding Co., Inc., Midvale, UT (US)

( * ) Notice: Subject to any disclaimer, the term of this patent is extended or adjusted under 35 U.S.C. 154(b) by 616 days.

(21) Appl. No.: 15/492,618

(22) Filed: Apr. 20, 2017

(65) Prior Publication Data

US 2018/0309867 A1    Oct. 25, 2018

(51) Int. Cl.
| | |
|---|---|
| *G06F 3/01* | (2006.01) |
| *G06F 3/03* | (2006.01) |
| *H04M 1/18* | (2006.01) |
| *B32B 17/06* | (2006.01) |

(52) U.S. Cl.
CPC ............ *G06F 3/013* (2013.01); *G06F 3/0304* (2013.01); *B32B 17/06* (2013.01); *G06F 2200/1634* (2013.01); *G06F 2203/048* (2013.01); *H04M 2250/22* (2013.01); *Y10T 428/24* (2015.01)

(58) Field of Classification Search
CPC ...... G06F 3/013; G06F 3/0304; G06F 1/1626; G06F 2200/1634; G06F 2203/04809; H04M 1/0266; H04M 1/72563; H04M 2250/52; H04M 1/185; H04M 2250/22; B32B 17/06; B44F 1/063; Y10T 428/14

USPC ......................................................... 345/173
See application file for complete search history.

(56) References Cited

U.S. PATENT DOCUMENTS

| | | | | |
|---|---|---|---|---|
| 7,914,644 | B2 * | 3/2011 | Jiang ....................... | B29C 63/02 156/325 |
| 8,044,942 | B1 * | 10/2011 | Leonhard ................ | G06F 3/041 345/173 |
| 8,640,759 | B2 * | 2/2014 | Chen ................... | B29C 63/0004 156/538 |
| 9,061,542 | B1 * | 6/2015 | Huang .................. | G06F 1/1626 |
| 9,292,128 | B1 * | 3/2016 | Huang .................. | G06F 1/1643 |
| 2004/0227722 | A1 * | 11/2004 | Friberg ................. | G06F 1/1609 345/156 |
| 2011/0279383 | A1 * | 11/2011 | Wilson .................. | G06F 3/0412 345/173 |
| 2012/0211171 | A1 * | 8/2012 | Patel ...................... | B29C 63/02 156/538 |

(Continued)

*Primary Examiner* — Sonya M Sengupta
(74) *Attorney, Agent, or Firm* — Thorpe, North & Western, LLP (57) ABSTRACT

A system and method for aligning a screen protector to a cell phone comprises a screen protector with an alignment liner disposed over the screen protector; alignment indicia disposed on the alignment liner; and a display source configured to enable display of alignment indicia on the display screen of the cell phone. The alignment indicia of the display screen correspond to the alignment indicia of the alignment liner so that the alignment indicia of the alignment liner is capable of being aligned over the alignment indicia on the display screen to properly align the screen protector with the display screen when the screen protector is positioned above the display screen.

20 Claims, 5 Drawing Sheets

(56) References Cited

U.S. PATENT DOCUMENTS

| | | | | |
|---|---|---|---|---|
| 2013/0055080 A1* | 2/2013 | Komer | ............... | G06F 3/0418 |
| | | | | 715/709 |
| 2013/0316112 A1* | 11/2013 | Leonhard | ............... | B32B 7/12 |
| | | | | 428/38 |
| 2015/0097818 A1* | 4/2015 | Blackmer | ............ | G02B 27/648 |
| | | | | 345/207 |
| 2015/0273786 A1* | 10/2015 | Ozeki | ............... | B32B 3/10 |
| | | | | 428/41.7 |
| 2017/0297268 A1* | 10/2017 | Witham | ............... | B29C 65/48 |
| 2017/0313036 A1* | 11/2017 | Lin | ............... | B32B 27/32 |

\* cited by examiner

SYSTEM FOR ALIGNING A SCREEN PROTECTOR ON AN ELECTRONIC DEVICE

BACKGROUND

Supplemental screen protectors are often installed by users over a display screen of a cell phone to provide protection to the screen from scratches and/or impacts. Such screen protectors typically extend past the display screen and onto a front or forward facing surface of the cell phone. Cell phones typically have other features on the front or forward facing surface, such as a button, a speaker outlet, a camera, etc. Many screen protectors have holes or notches to be aligned with the features so as to resist interference with those features. Thus, it is necessary to align the screen protector properly with respect to the display screen and the features. In addition, many screen protectors have an adhesive for adhering the screen protector to the front or forward facing surface. The adhesive and misalignment of the screen protector can result in frustration to the user and even molestation of the screen protector during removal.

FIELD OF THE INVENTION

The field of invention relates to systems and methods for aligning a screen protector on an electronic device, such as a cell phone.

DETAILED DESCRIPTION

Definitions

The term "portable handheld electronic device" is used herein to refer to a laptop computer, tablet or tablet computer, phablet, cellular or cell phone, game, and the like, with a display screen, and that is portable and handheld. The display screen can be a touch screen that can receive input by touch such as finger swipes, and/or can have a virtual keyboard. The device can have a battery and memory and a processor with software running thereon. The device can have cellular, WiFi and/or Bluetooth connectivity, and can have a wireless transmitter, receiver, or transceiver. Thus, the device can provide internet browsing, game playing, movie and picture display, e-book display, etc. In addition, the device can include a digital camera. Throughout the description, the term "cell phone" will be used as an example of the portable handheld electronic device, and such use of the term "cell phone" includes all portable handheld electronic devices.

The term "screen protector" is used herein to refer to a layer or film placed on or over a display screen of the portable handheld electronic device to provide protection to the display screen. The screen protector can comprise one or more layers, such as an adhesive layer, etc. The screen protector can be transparent such that the display screen can be viewed through the screen protector. The screen protector can be rigid enough to maintain its shape and be self-supporting. In one aspect, the screen protector can be disposed directly on the display screen. In another aspect, the screen protector can be disposed over and above the display screen, with a space or gap therebetween. The screen protector can have a size and shape to substantially match or cover the display screen. In addition, the screen protector can extend beyond the display screen and cover other portions of a user surface of the portable handheld electronic device. The screen protector can have notches or cut-outs in the perimeter thereof, and/or apertures therethrough, to accommodate accessories of the portable handheld electronic device, such as a camera lens, a speaker, a button, etc. In addition, the screen protector can have lateral sides that are curved to match or follow a curvature of the display screen, which can have curved lateral sides extending to lateral edges of the portable handheld electronic device. The outermost lateral edges of the screen protector can contact the display screen to eliminate a gap at the lateral perimeter of the screen protector and the display screen. Thus, the curvature of the lateral edges of the screen protector can have a slightly different curvature than the lateral edges of the display screen.

Description

As illustrated in FIGS. 1-8, a system 10 is shown for aligning a screen protector 14, to a portable hand-held electronic device, such as a cellular phone 18, in an example implementation in accordance with the invention. The cellular phone or cell phone 18 will be referenced throughout as an example of the portable hand-held electronic device. The cell phone 18 has a display screen 22. In one aspect, the display screen can be flat. In another aspect, the display screen can have curved lateral edges on opposite lateral sides of the screen. The display screen 22 defines a front or forward facing surface or a user facing surface 30 that faces towards the user during use. The user facing surface 30 can be an active surface of the cell phone 18, providing visual display and allowing for user input. In one aspect, the cell phone 18 and/or lateral edges thereof can be curved, and the display screen can extend into the curved lateral edges of the cell phone. A majority of the display screen and center portion thereof, between the curved lateral edges in one aspect, can be flat. In addition, the display screen 22 can form a majority, and substantially all, of the user facing surface 30. A top and/or bottom of the screen can be banded or framed by the user facing surface. The banded or framed portion of the user facing surface can accommodate accessories or features, such as a camera 34, a speaker 38, a button, etc. The cell phone can also have a microphone 42.

The cell phone 18 can have a size, shape and/or profile, at least a portion of which, and namely a vast majority of which, is desired to be protected by the screen protector 14. The cell phone 18 can be a predetermined cell phone with a known size and shape, and a known configuration of features or accessories; and the screen protector 14 can be sized and shaped to substantially match (with desired gaps and/or contact points) the cell phone 18 or display screen 22 thereof, and can have holes and/or notches corresponding to the features or accessories of the cell phone.

The screen protector 14 can be applied over the user facing surface 30, and the display screen 22, of the cell phone 18. The screen protector 14 has a lateral perimeter that substantial matches the lateral perimeter of the display screen 22 of the cell phone 18, including the curved lateral sides in one aspect. In one aspect, a space or gap can be disposed between the screen protector 14 and the display screen 22, while the lateral edges of the screen protector 14 contact the edges of the cell phone 18. In addition, longitudinal ends of the screen protector 14 can extend beyond the display screen 22, and can have notches or cut-outs to accommodate accessories or features of the cell phone 18, such as a camera lens, a speaker, a button, etc. Thus, the screen protector 14 substantially matches, without necessarily exactly matching, the user facing surface 30 of the cell phone 18.

In one aspect, the screen protector can comprise or can be formed of a glass-like plastic infused with sapphire crystals. In another aspect, the screen protector can comprise or can be formed of glass. In one aspect, the material forming the screen protector can be substantially rigid and can hold its shape, while being flexible enough to be deflected when a force is applied, such as by being touched or pushed by a user's finger. In another aspect, the material forming the screen protector can include multiple layers and/or films of material.

The screen protector 14 can comprise, or can be provided with, layers forming a laminate or stack of layers. The layers or stack of layers can include an adhesive layer adhering the screen protector 14 to the user facing surface 30 of the cellular phone 18. The adhesive layer can have an adhesive perimeter substantially matching at least a portion of a perimeter of the display screen of the cell phone 18, and/or at least a portion of the screen protector 14. In one aspect, the adhesive layer can cover the entire screen protector 14, or inner face thereof. In another aspect, the adhesive layer can extend around an entire perimeter of the screen protector 14. In another aspect, the adhesive layer can be disposed only at the lateral ends of the screen protector. The screen protector 14 can also be provided initially with an inner release liner covering and releasably adhered to the adhesive layer. The inner release liner can protect, and can be peeled from, the adhesive layer prior to installation of the screen protector 14 on the cell phone 18.

In addition, the screen protector 14 can also be provided initially with an alignment layer 50 disposed over and releasably coupled to an outer surface of the screen protector 14. The alignment layer 50 can be translucent and can have a contrasting color to facilitate positioning and orienting the screen protector 14, with the alignment layer 50 thereon, over the display screen 22 of the cellular phone 18. Furthermore, the layers or stack of layers can include an outer release liner disposed over the alignment layer 50 and the screen protector 14. In one aspect, the alignment layer 50 or the outer release liner can also comprise opposite tabs 58 extending from opposite ends thereof to facilitate handling of the screen protector during installation, removal of the alignment layer and/or the outer release liner after installation, and alignment of the layers or stack or layers as described below. The screen protector 14 and the alignment liner 50, and the outer release liner in one aspect, can define an alignment pair 62 that remain together while the screen protector 14 and/or the adhesive layer thereof is aligned with and disposed on the user facing surface 30 of the cell phone 18.

The system 10 comprises the alignment liner 50 having alignment indicia 66 disposed thereon and carried thereby, and thus carried by the screen protector 14. The alignment indicia 66 can be printed on the alignment liner 50. In one aspect, the alignment indicia 66 can comprise a cross-hair with a vertical or longitudinal line and a horizontal or lateral line that are orthogonal to one another, as shown. The cross-hair or the longitudinal and lateral lines can extend a height and width, respectively, of an area corresponding to the display screen 22. In another aspect, the alignment indicia can comprise another graphic. In one aspect, the alignment indicia 66 can be opaque while the alignment pair 62, or the screen protector 14 and the alignment liner 50, is transparent or translucent (the display screen 14 can be transparent while the alignment liner 50 can be translucent). In another aspect, the alignment indicia can be transparent while the alignment liner 50 can be opaque or translucent.

Similarly, the system 10 comprises a display source configured to enable display of alignment indicia 70 on the display screen 22 of the cell phone 18. The alignment indicia 70 of the display screen 22 correspond to, and providing guidance to, the alignment indicia 66 of the alignment liner 50 so that the alignment indicia 66 of the alignment liner 50 is capable of being aligned over the alignment indicia 70 on the display screen 22 to properly align the screen protector 14 with the display screen 22 when the screen protector is positioned above the display screen. Thus, in one aspect, the alignment indicia 70 can comprise a cross-hair with a vertical or longitudinal line and a horizontal or lateral line that are orthogonal to one another, as shown. The cross-hair or the longitudinal and lateral lines can extend a height and width, respectively, of the display screen 22. Thus, the cross-hair or the longitudinal and lateral lines of the alignment indicia 66 and 70 can be long and wide, respectively, to facilitate alignment.

In one aspect, the display source, or alignment indicia 70 supplied to the display screen 22, can be from an electronic page. The electronic page can be associated with the screen protector. Thus, the user can cause the cell phone to access the internet or world wide web (WWW), such as with a wireless transceiver over a wireless local area network (WLAN) or WiFi, and utilize a web browser running on the cell phone to access the electronic page, such as from a web site. In one aspect, the web address of the web site or page can be printed or disposed on the alignment liner 50. In another aspect, instructions can be provided with the screen protector with the web address. In another aspect, the alignment liner or the instructions can be provided with a QR code or barcode that can be scanned by the camera of the cell phone using a QR code reader application or app on the cell phone. The QR code or barcode can direct the cell phone or web browser to the web site or page.

In another aspect, the display source, or alignment indicia 70 supplied to the display screen 22, can be from an application or app running on the cell phone. The application can be associated with the screen protector. The application can have a graphic that displays on the display screen 22, and that includes the alignment indicia 70. In one aspect, the alignment liner or the instructions can be provided with a QR code or barcode that can be scanned by the camera of the cell phone using a QR code reader application or app on the cell phone. The QR code or barcode can direct the cell phone or web browser to a web site or page where the app can be downloaded. In another aspect, the application can turn the display screen off for a predetermined length of time to allow the display screen to be cleaned prior to installation of the screen protector.

Referring to FIGS. 6a-d, the alignment pair 62, or the screen protector 14 and the alignment liner 50, are shown in various steps of installation on the cell phone 18. In one aspect, the display source can further be configured to display graphic and/or text instructions 74 for aligning and securing the screen protector 14 with respect to the display screen 22. The instructions 74 can be displayed on the display screen 22 by either the app or the web site or page. In one aspect, the instruction 74 can be displayed in a series of separate steps presented on separate pages. In one aspect, the pages can be advanced sequentially on a predetermined time schedule. In another aspect, the application can receive touch commands from the user on the display screen 22 to pause and/or progress the instructions. For example, the pages can include a user input on the display screen that the user can touch to advance to the next page. In another aspect, the application can receive voice commands from the user into the microphone 42 to pause and/or progress installation instructions associated with installation of the screen protector. In another aspect, the instructions can be audible and can be played by the application through the speaker 38 of the cell phone.

Figure 7:
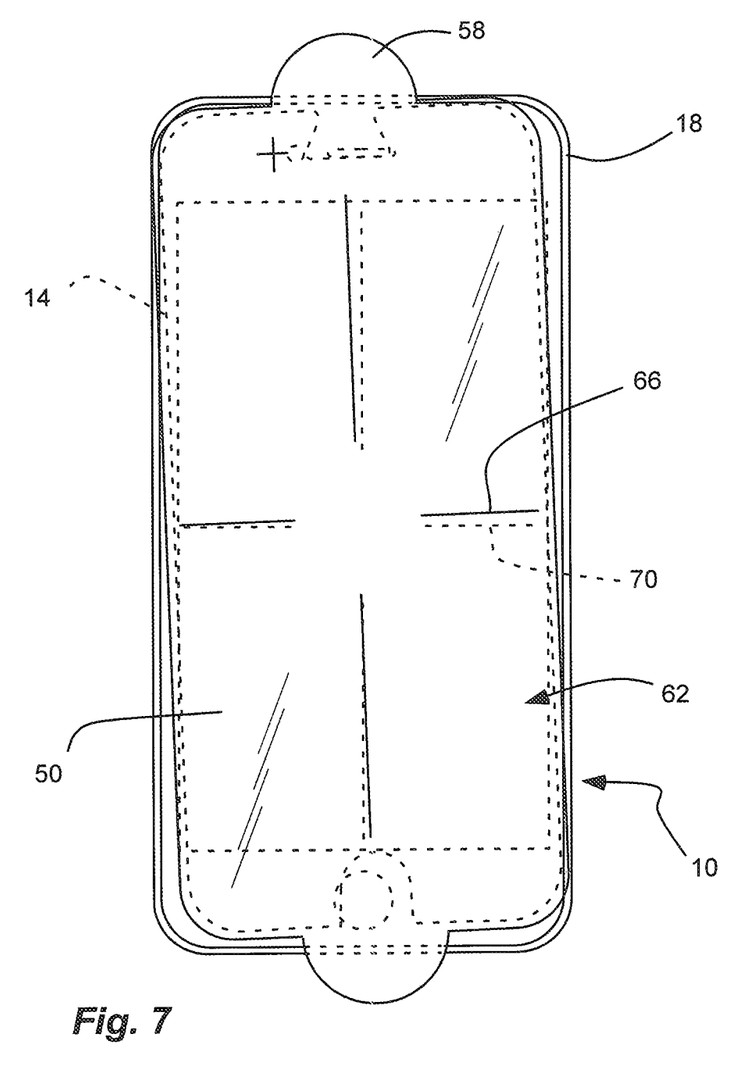
FIG. 7 is a top view of the system of FIG. 1, shown with the screen protector with the alignment liner dispose over the cell phone, and showing the screen misaligned with respect to the cell phone.

Referring to FIG. 7, the alignment pair 62, or the screen protector 14 and the alignment liner 50, are shown disposed over and mis-aligned with respect to the cell phone 18. In another aspect, the alignment liner 50 can comprise camera indicia 78 located on the alignment liner to be disposed over the camera 34 of the cell phone 18 during installation of the screen protector 14 on the display screen 22. The camera indicia 78 can be capable of being discerned by the camera 34. In one aspect, the camera indicia 78 can be separate and distinct from the alignment indicia 66. In another aspect, the alignment indicia 66 can be the camera indicia 78. Thus, the camera 34 can discern the alignment indicia 66. The application can determine a location and/or an orientation of the screen protector 14 relative to the display screen 22, and can provide directional feedback 82 to correct the location and/or the orientation of the screen protector. In one aspect, the directional feedback 82 can be displayed visually on the display screen 22. In another aspect, the directional feedback can be audible played by the speaker 38.

Figure 8:
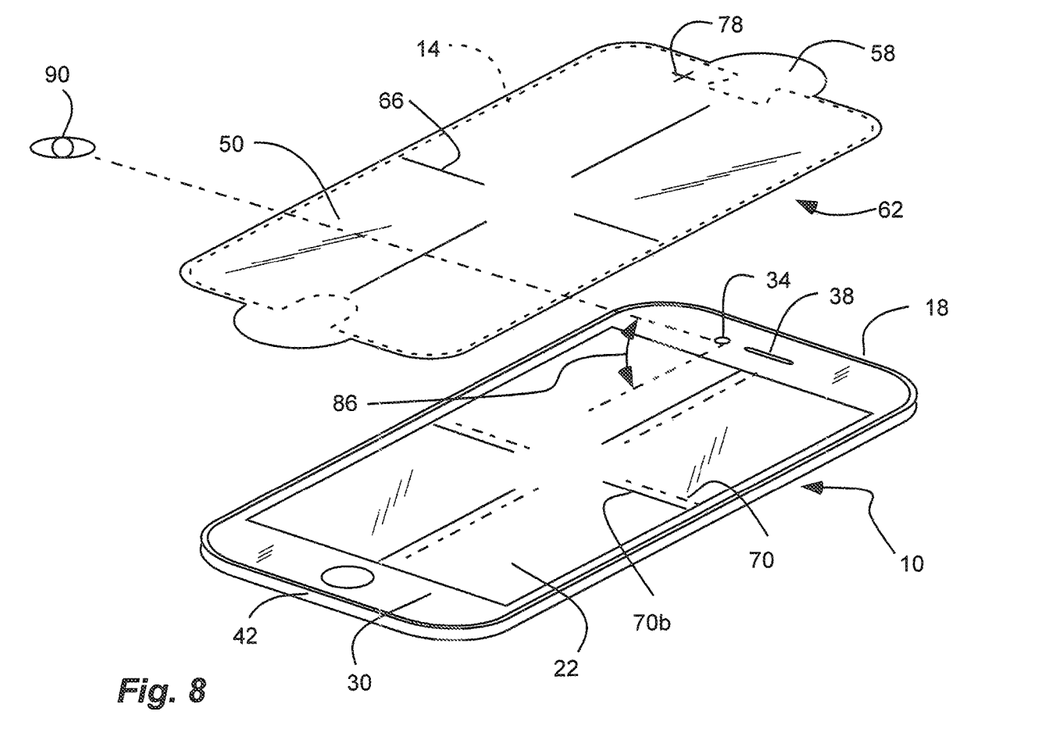
FIG. 8 is a perspective view of the system of FIG. 1, shown with the screen protector with the alignment liner dispose over the cell phone.

Referring to FIG. 8, the alignment pair 62, or the screen protector 14 and the alignment liner 50, are shown disposed over the cell phone 18. In one aspect, the application can determining a viewing angle 86 of the display screen 22 of the cell phone 18 with respect to a user's eyes 90 using the camera 34 of the cell phone 18. The viewing angle (or pitch) can also comprise a directional orientation (or yaw). The application adjusting a location of the alignment indicia, adjusted alignment indicia 70b as opposed to the alignment indicia 70 described above, displayed on the display screen 22 of the cell phone 18 based on the viewing angle.

Figure 1:
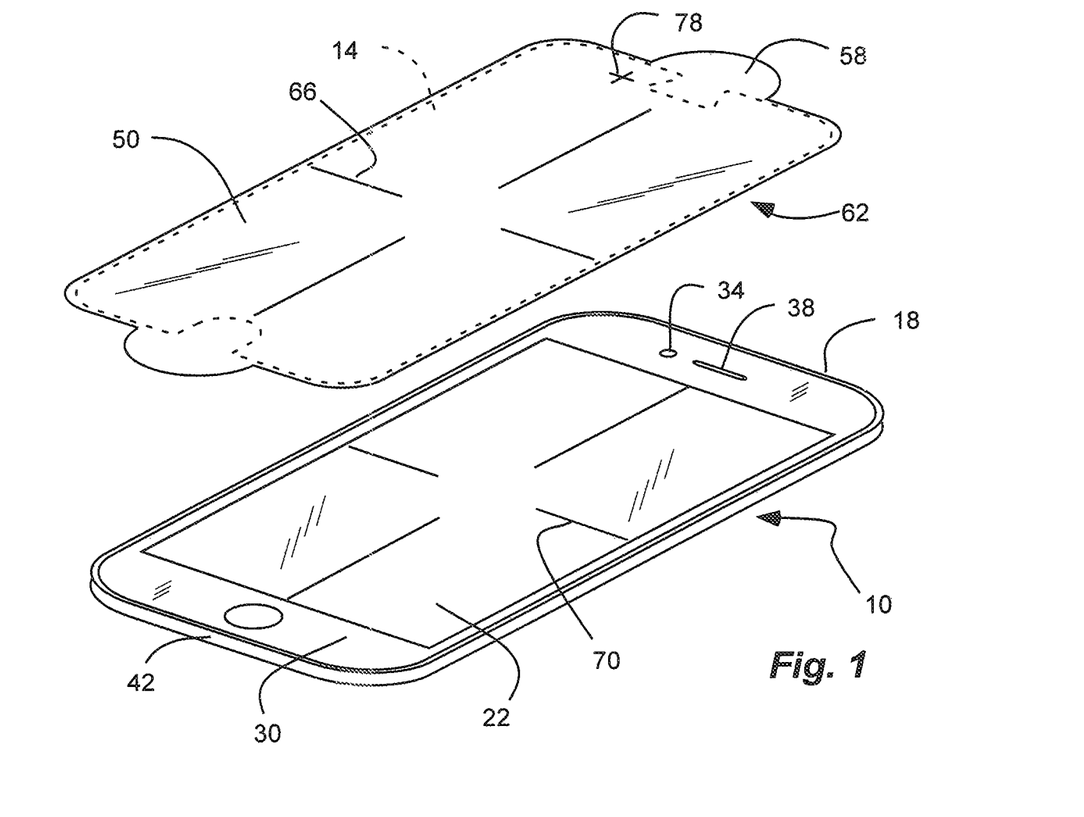
FIG. 1 is a perspective exploded view of a system for aligning a screen protector with a cell phone according to an example of the present technology, shown with the screen protector and an alignment liner with alignment indicia disposed over the cell phone, and cell phone displaying alignment indicia.
Figure 2:
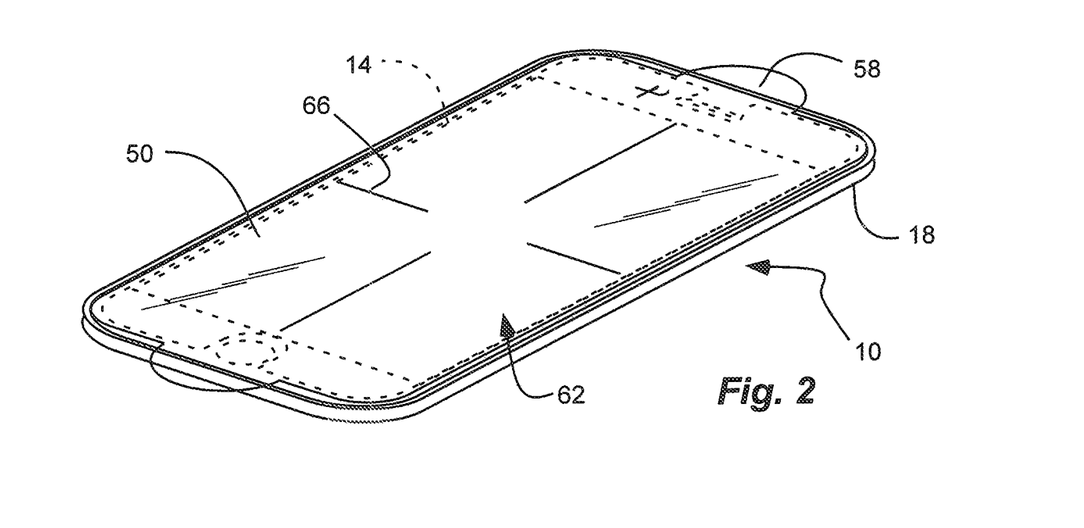
FIG. 2 is a perspective view of the system of FIG. 1, shown with the screen protector with the alignment liner dispose on the cell phone.
Figures 3, 4, 5:
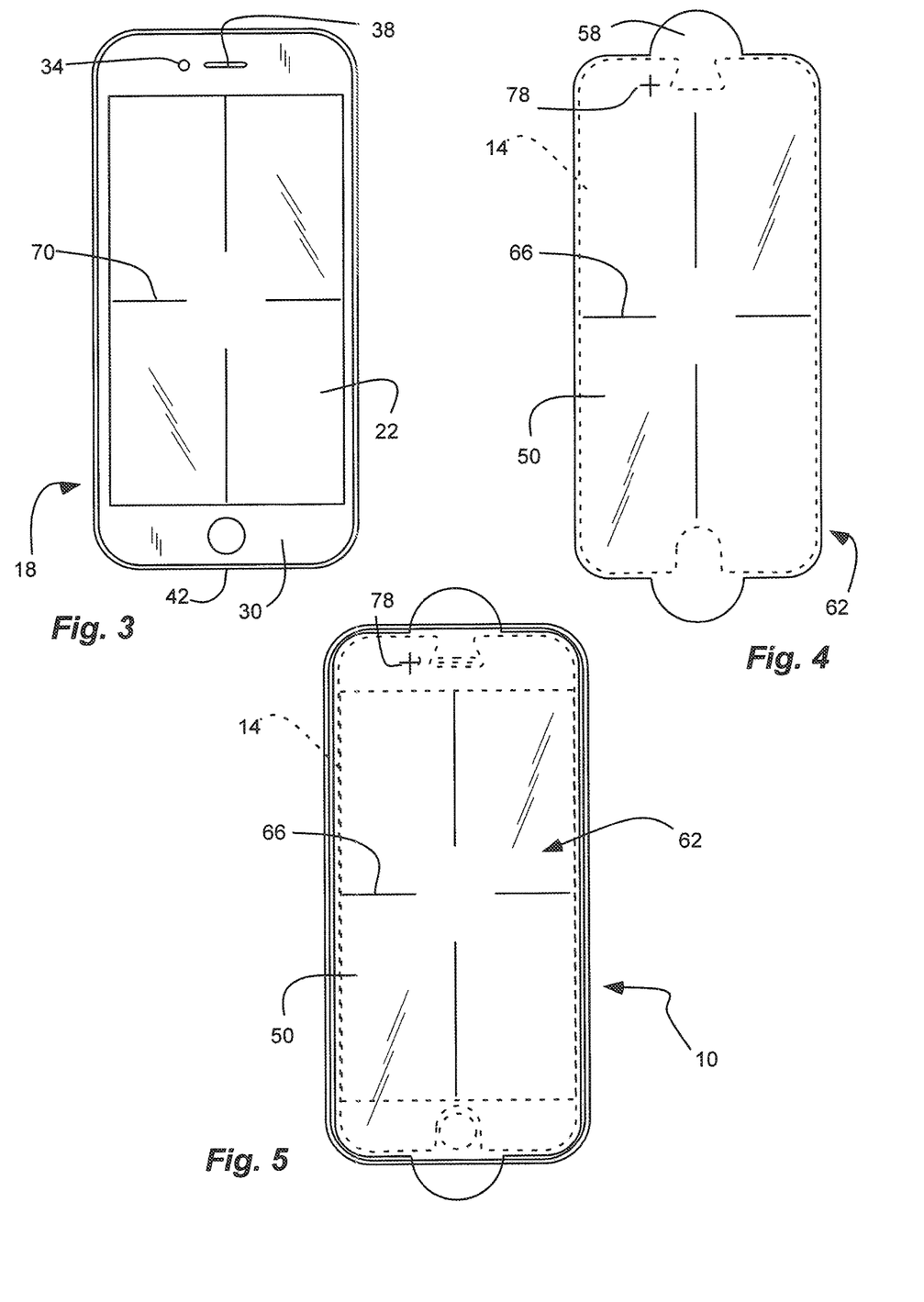
FIG. 3 is a top view of the cell phone displaying the alignment indicia of FIG. 1.
FIG. 4 is a top view of the screen protector with the alignment liner having the alignment indicia of FIG. 1.
FIG. 5 is a top view of the system of FIG. 1, shown with the screen protector with the alignment liner dispose on the cell phone.
Figure 6A:
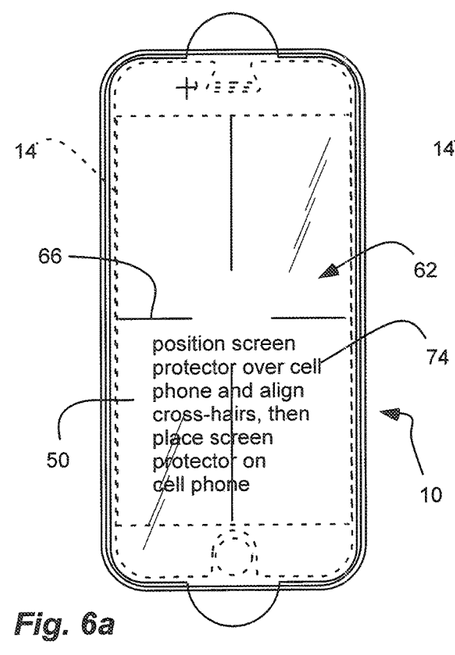
FIGS. 6a-d are top views for the cell phone displaying installation instruction in accordance with an example of the technology.
Figure 6B:
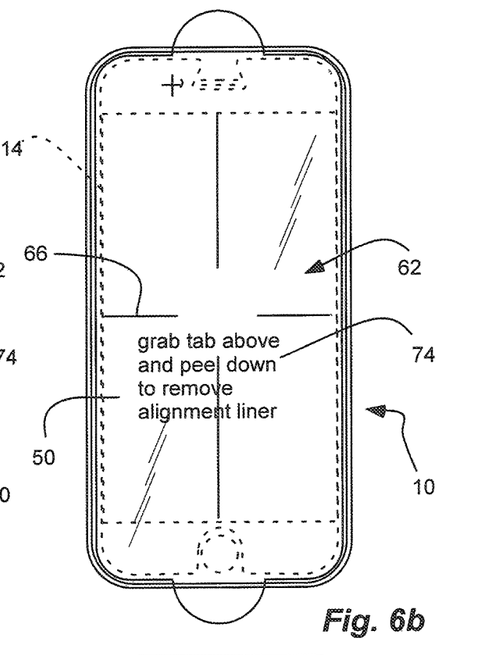
Figure 6C:
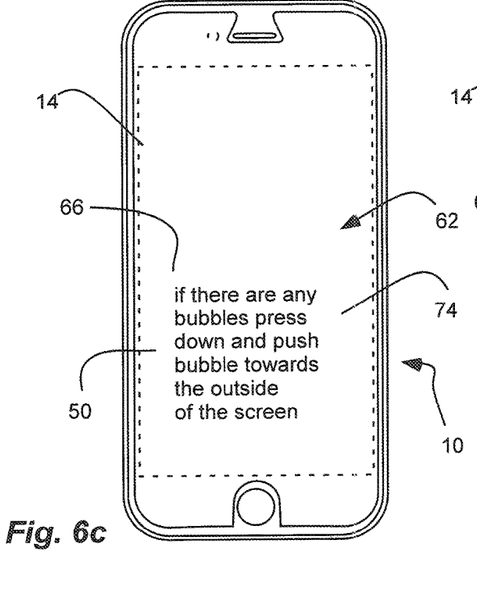
Figure 6D:
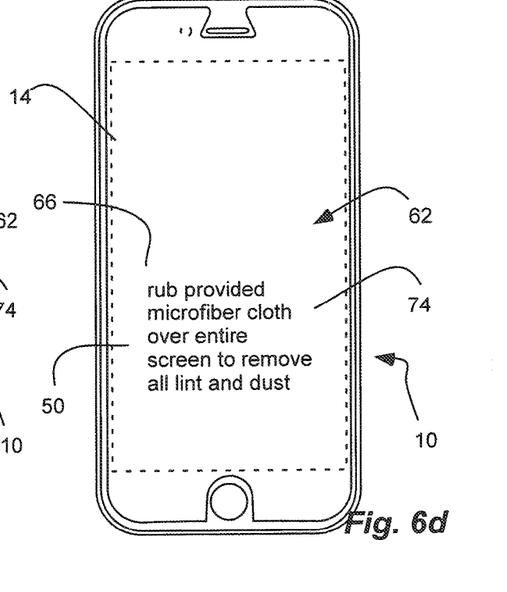

A method for installing or coupling the screen protector 14 to the cell phone 18, and for using the system 10 described above, comprises obtaining the screen protector 14 with the alignment liner 50 disposed over the screen protector, and having alignment indicia 66 disposed on the alignment liner. The method further comprises bringing the screen protector 14 into proximity of, or over, the display screen 14 and/or the user facing surface 30, as shown in FIGS. 1, 5, 7 and 8. The alignment indicia 66 of the alignment liner 50 is aligned with the alignment indicia 70 or 70b of the display screen 22, as shown in FIGS. 1, 7 and 8. While the alignment indicia 66 of the alignment liner 50 remains aligned with the alignment indicia 70 or 70b of the display screen 22, the screen protector 14 is placed on the display screen 22. The screen protector 14 is affixed to the display screen 22, such as by pressing the adhesive to the display screen 22 and/or the user facing surface 30. The alignment liner 50 can be removed from the screen protector 40, such as by grasping the tab 58 and peeling the alignment liner 50 from the screen protector 14.

The graphic and/or text instructions 74 displayed on the display screen 22 can be followed for aligning and securing the screen protector 14 with respect to the display screen 22. In one aspect, the method can comprise causing the display screen to display the alignment indicia from an electronic page, such as from a web site. In another aspect, the method can comprise causing the display screen to display the alignment indicia from an application running on the cell phone. In another aspect, the method can comprise causing the cell phone to sense a position and/or an orientation of the screen protector with respect to the display screen; causing the display screen to display adjustment indicia and/or instructions to align the screen protector with respect to the display screen; and following the adjustment indicia and/or the instructions. In another aspect, the method can comprise causing the cell phone to sense a position and/or an orientation of the screen protector with respect to the display screen; causing the cell phone to display adjustment indicia and/or instructions to align the screen protector with respect to the display screen; and following the adjustment indicia and/or instructions. In another aspect, the method can comprise causing the cell phone to sense a viewing angle between a user's eyes and the display screen using the camera of the cell phone; causing the cell phone to adjust a location of the alignment indicia displayed on the display screen of the cell phone based on the viewing angle; and following the alignment indicia.

A method for aligning the screen protector 14 with the cell phone 18, and using the system 10 described above, can comprise: providing the screen protector 14 with the alignment liner 50 disposed over the screen protector 14, and having the alignment indicia 66 disposed on the alignment liner 50; and providing the alignment indicia 70 or 70b on the display screen 22 of the cell phone 18. In addition, graphic and/or text instructions 74 can be provided for aligning and securing the screen protector 14 with respect to the display screen 22. In one aspect, providing alignment indicia 70 can comprise displaying alignment indicia 70 from an electronic page, such as from a web site associated with the screen protector. In another aspect, providing alignment indicia 70 can comprise displaying alignment indicia 70 from an application associated with the screen protector and running on the cell phone. As described above, the method can comprise sensing a position and/or an orientation of the screen protector with respect to the display screen; and displaying adjustment indicia and/or instructions to align the screen protector with respect to the display screen. In addition, the method can comprise sensing a viewing angle between a user's eyes; and adjusting a location of the alignment indicia displayed on the display screen of the cell phone based on the viewing angle.

The system 10 can comprise a non-transitory computer-usable storage medium having instructions embodied therein that when executed cause a computer system, such as the cell phone, to perform a method for installing a screen protector 14 on a cell phone 18, the method comprising displaying alignment indicia 70 or 70b on the display screen 22 of the cell phone 18, the alignment indicia 70 or 70b of the display screen 22 corresponding to the alignment indicia 66 of the alignment liner 50 so that the alignment indicia 66 of the alignment liner 50 is capable of being aligned over the alignment indicia 70 or 70b on the display screen 22 to properly align the screen protector 14 with the display screen 22 when the screen protector is positioned above the display screen. The method can further comprise displaying graphic and/or text instructions 74 for aligning and securing the screen protector with respect to the display screen. The method can further comprise accessing an electronic page, such as from a web site associated with the screen protector and that has alignment indicia; and displaying the alignment indicia from the electronic page. The method can further comprise sensing a position and/or an orientation of the screen protector with respect to the display screen; and displaying adjustment indicia and/or instructions to align the screen protector with respect to the display screen. The method can further comprise determining viewing angle of the display screen of the cell phone with respect to a user's eyes using a camera of the cell phone; and adjusting a location of the alignment indicia displayed on the display screen of the cell phone based on the viewing angle.

Furthermore, a non-transitory computer-usable storage medium can have instructions embodied therein that when executed cause a computer system to perform a method for capturing and sharing video as described above.

A computing device, such as the cell phone, can have modules which may execute this technology. For example, the computing device may be a cell phone as described above. The computing device is capable of displaying alignment indicia on the display screen of the cell phone; displaying instructions for aligning and securing the screen protector with respect to the display screen; accessing a web page or site associated with the screen protector and that has alignment indicia; sensing a position and/or an orientation of the screen protector with respect to the display screen; and/or determining viewing angle of the display screen of the cell phone with respect to a user's eyes using a camera of the cell phone. The computing device can be a high-level example in which the technology may be executed. The computing device may include one or more processors that are in communication with memory devices. The computing device may include a local communication interface for the components in the computing device. For example, the local communication interface may be a local data bus and/or any related address or control busses as may be desired.

The memory device may contain modules that are executable by the processor(s) and data for the modules. The modules may execute the functions described earlier. A data store may also be located in the memory device for storing data related to the modules and other applications along with an operating system that is executable by the processor(s).

Other applications may also be stored in the memory device and may be executable by the processor(s). Components or modules discussed in this description that may be implemented in the form of software using high programming level languages that are compiled, interpreted or executed using a hybrid of the methods.

The computing device may also have access to I/O (input/output) devices that are usable by the computing devices. An example of an I/O device is a display screen that is available to display output from the computing devices. Other known I/O device may be used with the computing device as desired. Networking devices and similar communication devices may be included in the computing device. The networking devices may be wired or wireless networking devices that connect to the Internet, a LAN, WAN, or other computing network.

The components or modules that are shown as being stored in the memory device may be executed by the processor. The term "executable" may mean a program file that is in a form that may be executed by a processor. For example, a program in a higher level language may be compiled into machine code in a format that may be loaded into a random access portion of the memory device and executed by the processor, or source code may be loaded by another executable program and interpreted to generate instructions in a random access portion of the memory to be executed by a processor. The executable program may be stored in any portion or component of the memory device. For example, the memory device may be random access memory (RAM), read only memory (ROM), flash memory, a solid-state drive, memory card, a hard drive, optical disk, floppy disk, magnetic tape, or any other memory components.

The processor may represent multiple processors and the memory may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configuration definitions, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations that comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A method for coupling a screen protector to a cell phone having a display screen displaying alignment indicia and instructions thereon, the method comprising:
   bringing the screen protector into proximity of the display screen;
   following instructions displayed on the display screen of the cell phone for aligning the screen protector with respect to the display screen;
   aligning alignment indicia of an alignment liner of the screen protector with the alignment indicia of the display screen;
   placing the screen protector on the display screen while the alignment indicia of the alignment liner remains aligned with the alignment indicia of the display screen; and
   affixing the screen protector to the display screen.

2. The method of claim 1, wherein following instructions further comprises following graphic instructions, or text instructions, or both, displayed on the display screen.

3. The method of claim 1, further comprising causing the display screen to display the alignment indicia from a web page or site associated with the screen protector.

4. The method of claim 1, further comprising causing the display screen to display the alignment indicia from an application running on the cell phone and associated with the screen protector.

5. The method of claim 1, further comprising:
   causing the cell phone to sense a position, or an orientation, or both, of the screen protector with respect to the display screen; and
   causing the display screen to display adjustment indicia, or instructions, or both, to align the screen protector with respect to the display screen.

6. The method of claim 1, further comprising:
   causing the cell phone to sense a viewing angle between a user's eyes and the display screen using a camera of the cell phone;
   causing the cell phone to adjust a location of the alignment indicia displayed on the display screen of the cell phone based on the viewing angle; and
   following the alignment indicia.

7. The method of claim 1, further comprising removing the alignment liner from the screen protector.

8. The method of claim 1, wherein the alignment layer is disposed over and releasably coupled to an outer surface of the screen protector.

9. The method of claim 1, further comprising causing the cell phone to display the alignment indicia on the display screen.

10. The method of claim 1, wherein the alignment indicia displayed on the display screen is from an electronic page.

11. The method of claim 1, wherein the alignment indicia displayed on the display screen is from an application running on the cell phone.

12. The method of claim 11, wherein the application turns the display screen off for a predetermined length of time to allow the display screen to be cleaned prior to installation of the screen protector.

13. The method of claim 11, wherein the cell phone has a microphone and wherein the application receives voice commands to pause installation instructions, or progress installation instructions, or both, associated with installation of the screen protector.

14. The method of claim 1, further comprising:
disposing camera indicia disposed on the alignment liner over a camera of the cell phone, and the camera indicia being capable of being discerned by the camera; and
causing an application running on the cell phone to display the alignment indicia thereon; and
following directional feedback from the application to correct a location, or an orientation, or both, of the screen protector relative to the display screen.

15. The method of claim 14, wherein the application provides directional feedback audibly through a speaker of the cell phone.

16. The method of claim 14, wherein the application provides directional feedback visually through the display screen of the cell phone.

17. A method for coupling a screen protector to a cell phone having a display screen, the method comprising:
obtaining a screen protector with an alignment liner disposed over and releasably coupled to the screen protector, the alignment liner having alignment indicia disposed thereon;
bringing the screen protector into proximity of the display screen;
causing the cell phone to sense a position, or an orientation, or both, of the screen protector with respect to the display screen;
causing the display screen to display alignment indicia, or instructions, or both, to align the screen protector with respect to the display screen; and
following the alignment indicia, or the instructions, or both, to align the alignment indicia of the alignment liner of the screen protector with the alignment indicia of the display screen;
placing the screen protector on the display screen while the alignment indicia of the alignment liner remains aligned with the alignment indicia of the display screen;
affixing the screen protector to the display screen; and
removing the alignment liner from the screen protector.

18. The method of claim 17, further comprising following instructions displayed on the display screen of the cell phone for aligning the screen protector with respect to the display screen; and wherein the instructions comprise graphic instructions, or text instructions, or both.

19. A method for coupling a screen protector to a cell phone having a display screen, the method comprising:
obtaining a screen protector with an alignment liner disposed over and releasably coupled to the screen protector, the alignment liner having alignment indicia disposed thereon;
causing the cell phone to display alignment indicia on the display screen;
bringing the screen protector into proximity of the display screen;
causing the cell phone to sense a viewing angle between a user's eyes and the display screen using a camera of the cell phone;
causing the cell phone to adjust a location of the alignment indicia displayed on the display screen of the cell phone based on the viewing angle;
following the alignment indicia;
placing the screen protector on the display screen while the alignment indicia of the alignment liner remains aligned with the alignment indicia of the display screen;
affixing the screen protector to the display screen; and
removing the alignment liner from the screen protector.

20. The method of claim 19, further comprising following instructions displayed on the display screen of the cell phone for aligning the screen protector with respect to the display screen; and wherein the instructions comprise graphic instructions, or text instructions, or both.

* * * * *